Patented Aug. 8, 1939

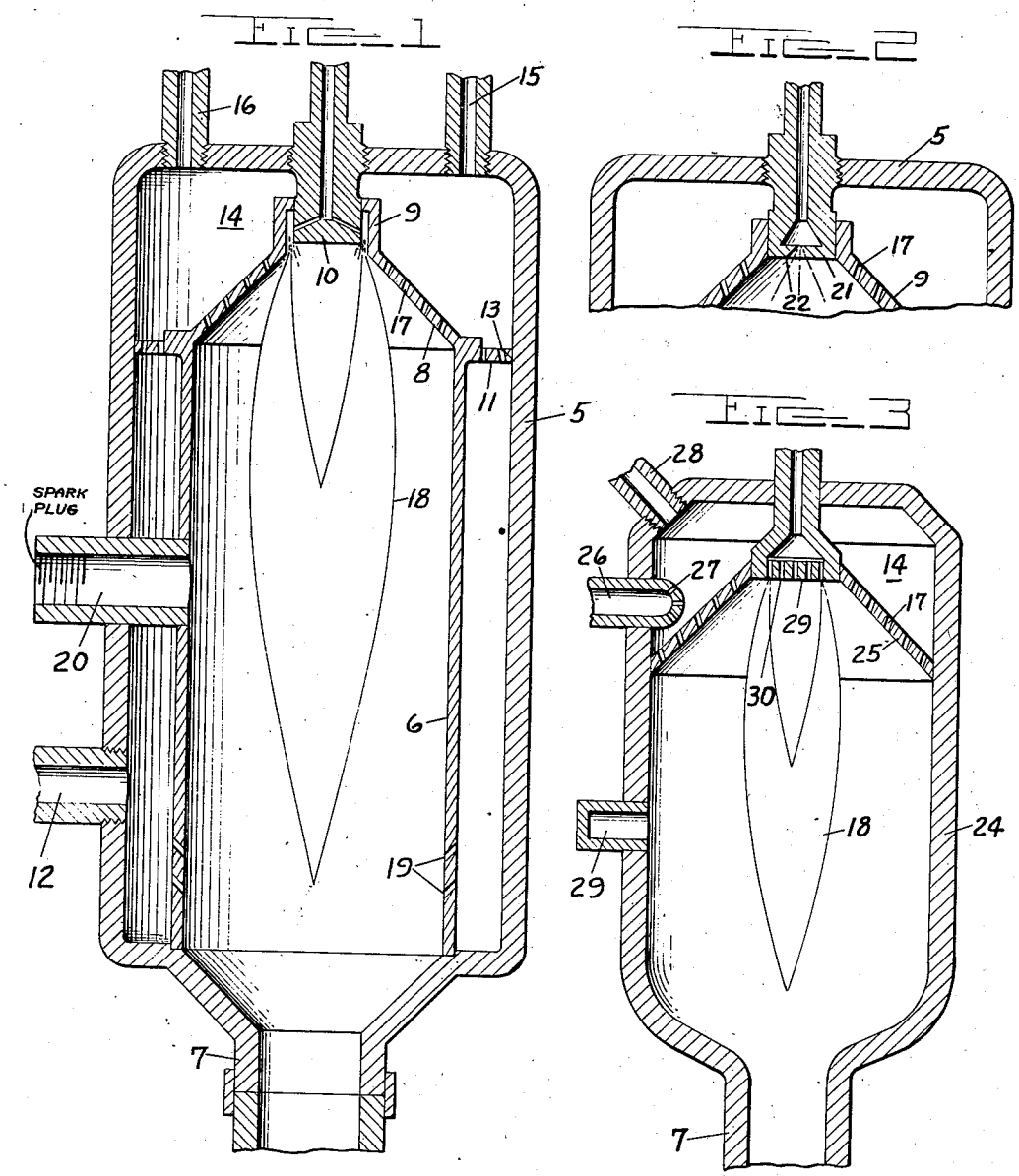

2,168,313

UNITED STATES PATENT OFFICE 2,168,313

COMBUSTION MEANS

Francis Russell Bichowsky, Toledo, Ohio

Application August 28, 1936, Serial No. 98,426

5 Claims. (Cl. 60—46)

(Granted under the act of March 3, 1883, as amended April 30, 1928; 370 O. G. 757)

This invention relates to the burning of highly combustible materials under pressure for the generation of gases that may be used as a working fluid.

Among the objects of this invention are:

To provide a combustion device adapted for the burning of fuels under high pressure and in a combustion space of small dimensions;

To provide a combustion device wherein a protective screen is formed between the zone of combustion and the wall of the combustion chamber;

To provide a device of the class mentioned wherein the walls of the combustion chamber need not be of high heat resistance;

To provide a method of burning fuel whereby notable quantities of heat are absorbed by an envelope around the zone of combustion, thereby reducing the temperature and increasing the volume of the gases.

In the drawing:

Fig. 1 is a longitudinal section of one form in which my invention may be embodied;

Fig. 2 is a fragmentary sectional view illustrating a different type of fuel supply means;

Fig. 3 is a longitudinal section of a form of my invention employing a single walled construction.

The large quantity of heat given off when highly combustible materials are burned under pressure, and the chemically active nature of the products of such combustion, are very destructive to materials of which the combustion chamber is constructed. Heretofore the walls of the combustion chamber have been protected by the use of refractory materials either as a lining or for constructing the chamber itself. Another method of protecting the combustion chamber walls is to circulate a cooling agent around such walls, while a third method is to make the chamber of such volume that the flame does not come in contact therewith. The present invention provides for the protection of the combustion chamber walls without resorting to any of the above mentioned practices and, without affecting the completeness of combustion, reducing the temperature of the gases and increasing their volume so they may be used directly for driving engines such as are ordinarily operated by steam.

To prevent the flame from touching the walls of the combustion chamber and at the same time keep the combustion chamber of small dimensions, I surround the flame or zone of combustion with an aeriform mantle or screen having a high power of heat absorption. This screen may be a mixture of the air which supports combustion, charged with a uniform spray of fine droplets of water. The water particles adjacent the flame are instantly evaporated, producing steam and thereby absorbing large quantities of heat, and by properly regulating the proportion of water droplets to the volume of air sufficient heat is absorbed to prevent destructive action on the walls of the combustion chamber. The steam thus generated increases the volume of gases available for driving a prime mover. Instead of water I may use carbon dioxide or other noncombustible gases having a high specific heat, or in some cases I may introduce steam, partially gasified hydrocarbons or a combustible gas. The air for supporting combustion may be introduced through the same nozzle as is the fuel, instead of in the protective screen. The mantle surrounding the zone of combustion may be of sufficient depth that the layers thereof adjacent the walls of the combustion chamber are not evaporated and so wipe these walls and cool them.

It is advantageous to design the apparatus so that the cross section of the combustion chamber is not greatly in excess of that of the flame or zone of combustion. The protective screen is introduced around the flame so that the material thereof moves at high velocity along lines substantially parallel to, but slightly convergent toward, the stream of burning fuel. In some cases it may so cool the fuel that incomplete combustion results, or the flame may even be extinguished, if all of the heat absorbing fluid is introduced adjacent the fuel jet and I, therefore, make provisions for adding a portion of the screening material substantially at the tip of the flame, where it is effective to reduce the temperature of the gases and produce steam but does not lower the temperature of the fuel below the point of complete and efficient combustion.

As shown in Fig. 1, the apparatus adapted for carrying out my present invention may comprise a substantially closed, preferably cylindrical, outer member 5 having within it and spaced therefrom a member 6 that defines the combustion chamber. The member 6 is open at its lower end and is there seated against the end portion of member 5, the gases from the combustion chamber passing out through a conduit 7. At the upper end of member 6 is a frusto-conical portion 8 whereof the small end merges into a cylindrical portion 9 within which is disposed the nozzle 10 for introducing the fuel, which is thus formed into a stream wherein the fuel moves along substantially parallel lines and is prevented from spreading out into contact with the member 6. Adjacent the base of portion 8 a laterally extending perforated flange 11 is disposed across the space between member 6 and member 5. While the portions 8 and 9 and flange 11 are shown as being integral with member 6, they may obviously be made separate.

A pipe 12 discharges water or other volatile fluid into the space between the members 5 and 6, and this fluid is forced through the perforations 13 in flange 11 into the mixing chamber 14 in the form of spray where it is intimately commingled with air introduced through the pipes 15 and 16. The gasiform mixture in chamber 14 is injected through perforations 17 in the portion 8 to form a screen or mantle around the flame 18. The axes of the perforations 17 are so oriented that the spray issuing therefrom into the combustion chamber moves substantially parallel to, but somewhat convergent toward, the path of the fuel stream. The droplets of water in the screen are evaporated and absorb large quantities of heat, thereby protecting the member 6 against the high temperature and the chemical activity of the flame. Since the material introduced through the perforations 17 may, if the quantity thereof is too great, lower the temperature of the fuel to a point where incomplete combustion results, or even extinguish the flame, I prefer to inject only a portion of the heat absorbing substance through portion 8 and provide perforations 19 through the member 6 for introducing a spray of the water or other heat absorbing fluid adjacent the outer portion of the flame, where it is effective in reducing the temperature of the gases and in producing steam, but can have no tendency to impair the degree of combustion.

A spark plug or other suitable igniting means may be mounted in the pipe 20 to initiate combustion within the member 6.

The form of invention shown in Fig. 2 is in general similar to that in Fig. 1, except that the fuel and the air for burning the same are introduced together through a nozzle 21 having outwardly diverging passages 22 for the fuel, whereby the flame may be brought into more direct and intimate contact with the spray injected through the perforations 17 in the portion 9. It is to be understood that the water or other heat absorbing fluid is introduced through the side of member 5 in the manner shown in Fig. 1.

The embodiment of my invention shown in Fig. 3 uses a single-wall combustion device 24 having a frusto-conical element 25 mounted therein adjacent one end to form a mixing chamber 14 into which the heat absorbing fluid is injected through a pipe 26 having at the end thereof within the mixing chamber a spray nozzle with perforations 27 to introduce the cooling fluid in the form of a mist, the air to support combustion being fed through the pipe 28. Fuel is supplied through a nozzle 29 having in it perforations 30 that extend parallel to the axis of the member 24. An igniting device may be seated in the member 29.

It will be obvious to those skilled in this art that the substances introduced into the combustion device will necessarily be under pressure greater than that existing in the combustion chamber. Suitable mechanical devices, such as pumps, may be utilized to provide the requisite pressure, or the substances may be fed from containers wherein they are under such pressures as will insure the proper supply thereof to the device. Inasmuch as such apparatus is well known, and constitutes no part of this invention, it is not shown in the drawing.

It is believed that the method of operating the combustion apparatus will be clear from the foregoing without further explanation.

The invention described herein may be manufactured and used by or for the Government of the United States of America for governmental purposes, without the payment of any royalty thereon.

I claim:

1. A combustion device, comprising a first substantially closed cylindrical member, a second member disposed therein and spaced therefrom to define a combustion chamber whereof the cross section is not greatly in excess of that of the flame maintained therein during normal operation, said second member having at one end a frusto-conical portion having at its small end a cylindrical terminal portion and having a laterally extending flange at the base of said frusto-conical portion reaching to said first member, the other end of said second member being open and fitting against an end of the first member; the said flange, the said frusto-conical portion and the wall of said second member adjacent said other end being provided with fine perforations; means to introduce fuel in the form of spray into the said cylindrical termination, means to introduce under pressure a fluid constituent of a combustible mixture into the space surrounding said frusto-conical portion, and means to introduce a volatile liquid into the space between said first and second members under such pressure that the said liquid is forced through said perforations to surround the flame in said second member with an atmosphere of the said liquid in comminuted form admixed with said fluid constituent.

2. A combustion device, comprising a first substantially closed cylindrical member, a second member disposed therein and spaced therefrom to define a combustion chamber, said second member having at one end a frusto-conical portion having at its small end a cylindrical terminal portion and having a laterally extending flange at the base of said frusto-conical portion reaching to said first member, the other end of said second member being open and fitting against an end of the first member; the said flange, the said frusto-conical portion and the wall of said second member adjacent said other end being provided with fine perforations; means to introduce fuel in the form of spray into the said cylindrical termination, means to introduce under pressure a fluid constituent of a combustible mixture into the space surrounding said frusto-conical portion, and means to introduce a volatile liquid into the space between said first and second members under such pressure that the said liquid is forced through said perforations to surround the flame in said second member with an atmosphere of the said liquid in comminuted form admixed with said fluid constituent.

3. A combustion device, comprising a first member that is substantially closed, a combustion chamber member disposed therein and spaced therefrom laterally and closed at one end but having its other end open and contacting an end of said first member; the said one end of said combustion chamber member including a perforated frusto-conical portion, a cylindrical terminal portion at the small end of said frusto-conical portion and a perforated flange extending from the base of said frusto-conical portion the wall of said first member, the axes of the perforations in said frusto-conical portion being convergently subparallel to the axis of the combustion chamber member; means to introduce a spray of fuel into said terminal portion, means to introduce a fluid constituent of a combustible mixture into the space surrounding said one end of the combustion chamber member, and means to introduce a volatile liquid into the space between said first member and the lateral wall of the chamber member, whereby said liquid is forced in the form of spray through the perforations in said flange and through the perforations in said frusto-conical portion, the wall of said chamber member adjacent its said other end being also perforated to admit said liquid in the form of spray into said chamber member.

4. A combustion device, comprising means defining a combustion chamber and a mixing chamber outside of and adjacent to one end only of said combustion chamber, means to introduce a spray of fuel into said combustion chamber at the said one end to move substantially parallel to the axis of said combustion chamber, means to introduce fluids of different characteristics into said mixing chamber, said fluids including at least one vaporizable liquid and means to introduce the mixture from said mixing chamber into said combustion chamber in a plurality of converging atomizing jets to form an envelope around said fuel spray, the said combustion chamber having adjacent its other end a circumferential series of atomizing openings to introduce a supply of said liquid adjacent the other end of the combustion zone.

5. A combustion device, comprising means defining a combustion chamber and a mixing chamber outside of and adjacent to one end of said combustion chamber, means to introduce a supply of fuel into said combustion chamber at said one end, means to introduce a supporter of combustion and atomizing jets of a heat absorbing vaporizable liquid into said mixing chamber to commingle the same, and means to introduce the comminglement thereof into said combustion chamber in the form of converging atomizing jets to constitute an envelope around said fuel spray, the said combustion chamber having adjacent its other end a circumferential series of atomizing openings to introduce a supply of said liquid adjacent the other end of the combustion zone.

FRANCIS RUSSELL BICHOWSKY.